Hill & Wood.

Gas Holder.

No. 2,149. Reissued Jan. 23, 1866.

UNITED STATES PATENT OFFICE.

MARTIN R. COOK, OF JERSEY CITY, NEW JERSEY, ASSIGNEE BY MESNE ASSIGNMENTS, OF S. HILL AND WM. J. WOOD.

IMPROVEMENT IN GAS-HOLDERS.

Specification forming part of Letters Patent No. 13,754, dated November 6, 1855; Reissue No. 2,149, dated January 23, 1866.

*To all whom it may concern:*

Be it known that STEPHEN HILL and WILLIAM J. WOOD, both of Rochester, in the State of New York, have invented a new and useful Improvement in Gas-Holders; and I do hereby declare that the following is a full, clear, and exact description thereof, reference being had to the accompanying drawings, making part of this specification, in which—

Figure 1:
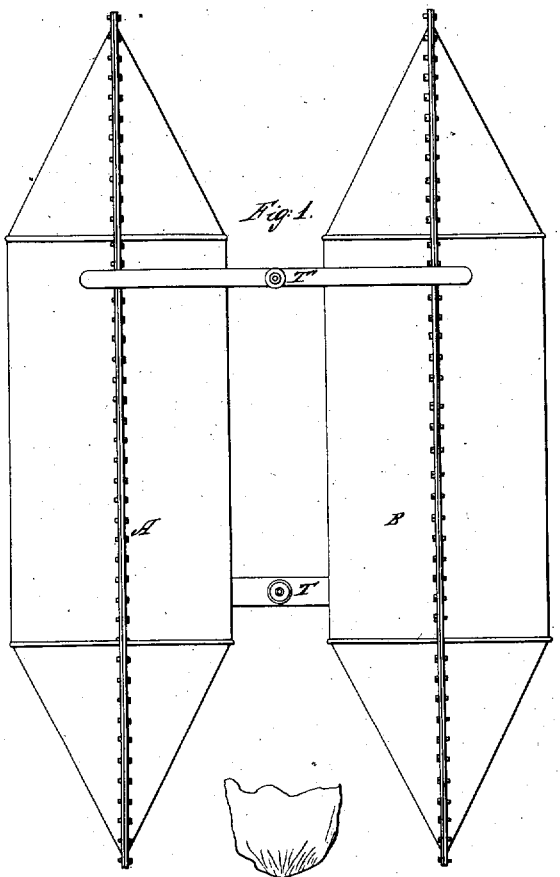
Figure 2:
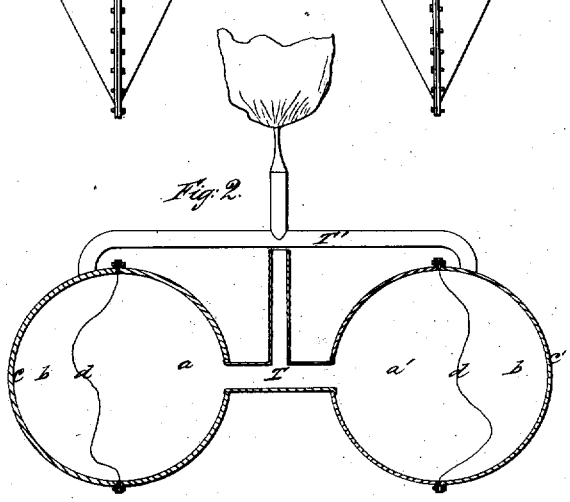

Figure 1 is a plan, and Fig. 2 a cross vertical section.

The same letters indicate like parts in both figures.

The gas holders known prior to the said invention were not adapted to locomotive purposes, such as supplying gas for lighting steamboats, railroad-cars, omnibuses, &c., for the reason that the diaphragm which separated the gas from the atmosphere, and by means of which the required pressure was applied to force the gas to the burners was so combined with the gas-holder as to be seriously agitated by concussions and jars.

Gas-holders, such as were employed in gas-works for lighting cities, were obviously not suitable for steamboats or railroad-trains. As a substitute for locomotive purposes it was proposed to connect the outer edge of a flexible diaphragm with the upper rim of a circular gas-holder and to place on this diaphragm a weighted disk of less diameter than the gas-holder to make the required pressure on the contained gas to force it to the burners. This proposed method failed, for the reason that the flexible diaphragm was weighted to make pressure on the gas and was entirely exposed to the atmosphere, in consequence of which whenever the holder was moved suddenly, as by the jars and concussions to which steamboats, railroad-trains, and carriages are very liable, the pressure on the contained gas was materially increased or diminished by inertia of the weighted diaphragm or by the resistance presented by the atmosphere to the whole surface of the diaphragm, thereby causing the flames at the burners to flicker, and oftentimes to be extinguished.

The object of this said invention was to avoid the difficulties above pointed out and that was accomplished by dispensing with the use of a weighted disk as a means of making pressure on the gas and inclosing the flexible diaphragm, so that it should not materially vary the pressure on the gas by inertia or the resistance presented by the surrounding air when the apparatus was subjected to jars or concussions.

The mode of application of this said invention which has been tried with success, and which has been adopted, is represented in the accompanying drawings, in which A and B represent two vessels which may be of any desired form, and made each in two parts with flanges connected by bolts or rivets, the flanges embracing a flexible diaphragm, *d*, of thin cloth impervious to gas—one such in each vessel—and made of such size that they will readily bend to a considerable extent. Each vessel or gas-holder is thus divided into two compartments or chambers, *a b* and *a′ b′*. The two chambers *a* and *a′* are connected by a tube, T, having a branch through which the required pressure can be applied to one surface of each of the diaphragms. The other two chambers *b* and *b′* are connected by another tube, T′, also having a branch leading to the burners.

It will be obvious from the foregoing that one or any number of such vessels or gas-holders may be used. If but one be used, the tube T will be made to communicate with one chamber, *a*, and the other tube T′ with the chamber *b*. The chambers which communicate with the burners by the tube T′ are to be filled with gas by any suitable means, and then it is to be forced out to supply the burners by the pressure of air on the opposite side of the diaphragms. The air for this purpose enters the chambers *a* and *a′* through the tube T, and may be forced in by a pump worked by a weight and suitable machinery, not necessary to describe.

When the chambers *b* and *b′* are to be recharged with gas, the air contained in the chambers *a* and *a′* is to be permitted to escape.

Any gaseous fluid may be substituted for air to make pressure on the opposite side of the diaphragm.

It will be obvious from the foregoing that the nature of the said invention consists simply in interposing between the gas to be supplied to the burners and atmospheric air or other aeriform fluid a thin membrane or cloth which is light, flexible, and impervious and so inclosed in a surrounding vessel that any sudden jar or concussion will not materially agitate what is inside of the vessel, so that the size, form, and number of vessels may be varied at pleasure, such as placing a bag within a surrounding vessel and having the gas within the bag and communicating with the burners, and the air or equivalent fluid surrounding the bag, or vice versa.

What is claimed as new, and desired to be secured by Letters Patent in gas holders for locomotive purposes, is—

Dividing the vessel into two compartments by an inclosed flexible diaphragm, or the equivalent thereof, when one of the said compartments is provided with a tube or tubes to supply gas to burners and the other is provided with a suitable aperture for the admission of air or equivalent gaseous fluid, substantially as and for the purpose described.

MARTIN R. COOK.

Witnesses:

L. HOWARD RUSSELL,

HENRY F. MOORE.